United States Patent [19]
Arnemann

[11] Patent Number: 6,009,905
[45] Date of Patent: *Jan. 4, 2000

[54] MOUNTING FOR A VALVE OPERATING MACHINE

[75] Inventor: Scott Arnemann, Rolling Meadows, Ill.

[73] Assignee: The E.H. Wachs Company, Wheeling, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/808,635

[22] Filed: Feb. 28, 1997

[51] Int. Cl.$^7$ ...................................................... F16K 31/12
[52] U.S. Cl. .......................... 137/899; 137/351; 251/292
[58] Field of Search ............................ 251/292; 137/899, 137/899.1, 351

[56] References Cited

U.S. PATENT DOCUMENTS

| | | | |
|---|---|---|---|
| 1,191,947 | 7/1916 | Clark | 137/351 |
| 1,536,081 | 5/1925 | Dean | 137/351 |
| 3,984,052 | 10/1976 | Di Palma | 137/899.1 |
| 5,381,996 | 1/1995 | Arnemann et al. | 251/129.12 |
| 5,570,581 | 11/1996 | Preston . | |

OTHER PUBLICATIONS

Wachs Model TM–2 Operating Manual published prior to Nov. 10, 1989.

Wachs Model TM–3 Operating Manual publisged prior to Nov. 10, 1989.

*Primary Examiner*—A. Michael Chambers
*Attorney, Agent, or Firm*—Robert L. Marsh

[57] ABSTRACT

A valve turning machine includes an adjustable length mount to retain the machine on the bed of a truck. Also, an improved track facilitates the movement of the table and motor assemble between a retracted position and an extended position.

10 Claims, 5 Drawing Sheets

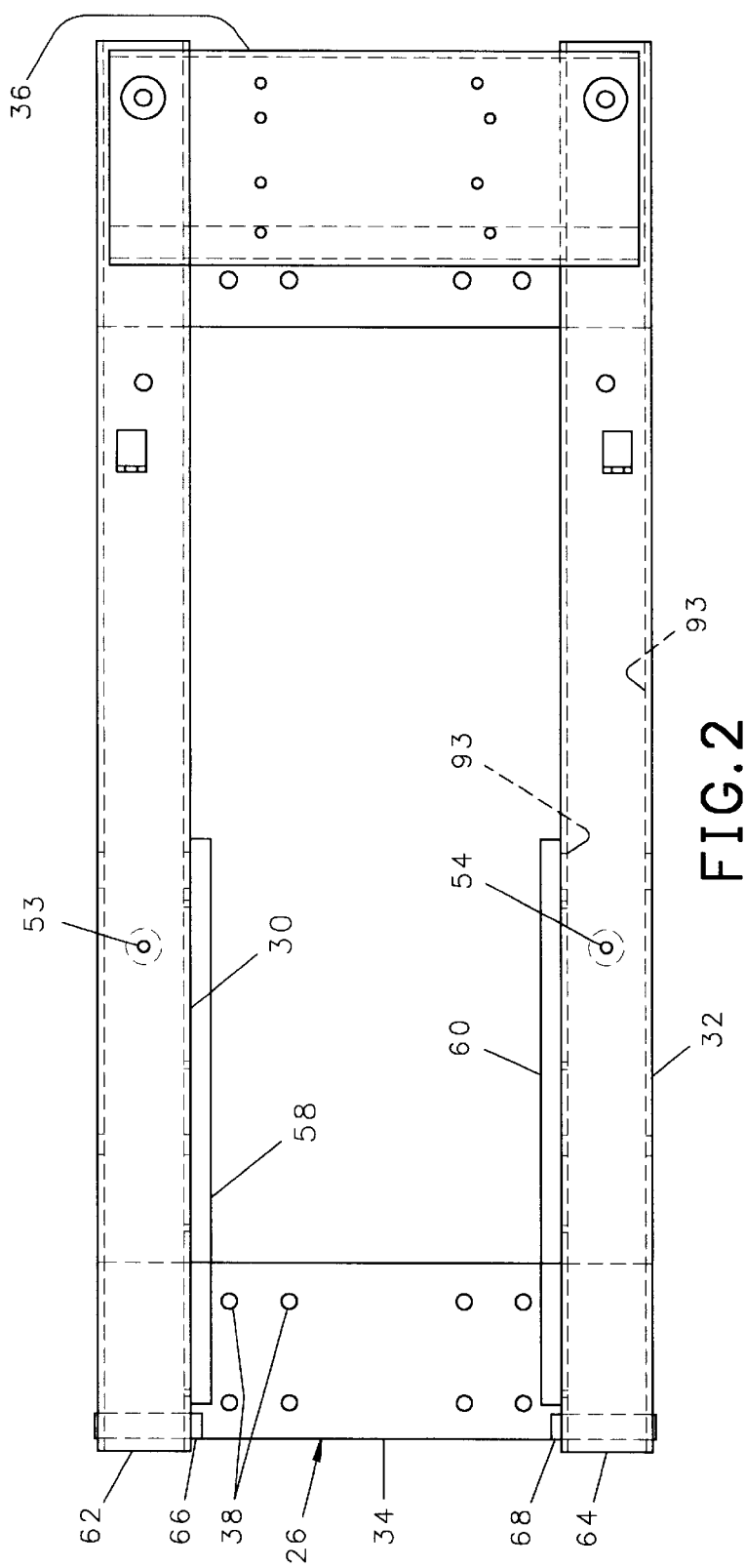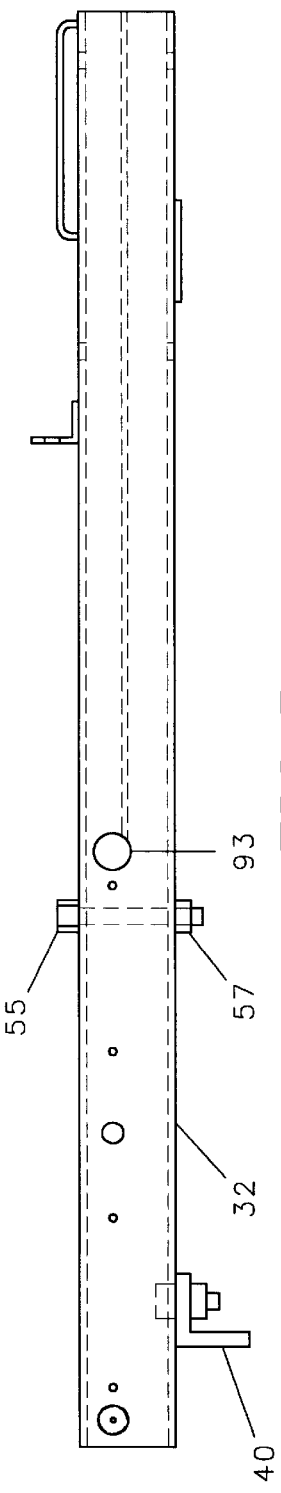

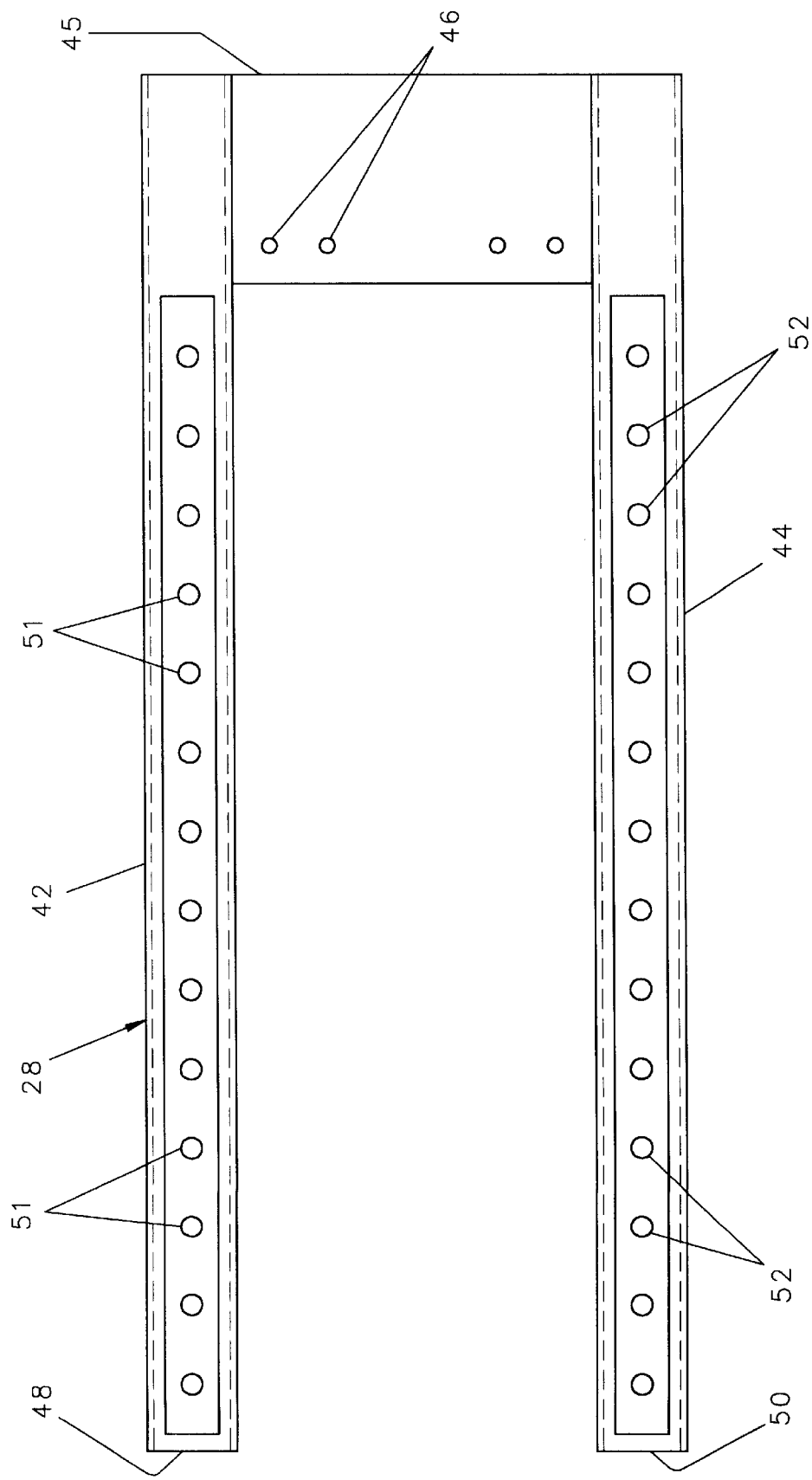

MOUNTING FOR A VALVE OPERATING MACHINE

The present invention relates to valve operating machines of the type mounted on the bed of a truck for turning a valve positioned below ground level by rotating a key extending to the valve and, in particular, to improved mountings for such valve operating machines.

BACKGROUND OF THE INVENTION

The distribution of water through a municipality includes an extensive network of piping through which water is moved from storage and pumping stations to users. The piping includes numerous valves such that portions of the network can be closed off as needed for service while the remaining network remains operational. The pipes for a typical municipality will range from 3 inches in diameter to 36 inches in diameter, and the valves associated with such pipes have corresponding ranges and sizes.

The valves in the water systems of such a municipality may remain in the open condition or in the closed condition for long periods of time during which they are subjected to moisture and temperature changes, and the parts of the valves undergo certain deterioration over time. An infrequently operated valve often becomes frozen or locked into its position as a result of contamination and deterioration.

To open such valves, valve operating machines are provided which may be mounted on a truck or the like and positioned over the shaft leading to the valve. An elongate key has a lower end which fits around the stem of the valve, and the key is rotated by a hydraulic motor in the machine.

Existing truck mounted valve operating machines have a frame for mounting the machine to the bed of a truck. Positioned on the frame is a pair of spaced parallel tracks and slidable within the tracks is a table. Mounted on the table are a pair of hydraulic motors, and extending horizontally through the table is an polygon shaped aperture positioned between the motors through which a rotatable key having a complementarily shaped polygon cross section, can be fitted. To operate the valve turning machine a truck is positioned near a shaft leading to a valve. The table is slid along the tracks until it extends outward of the truck and over the shaft extending to the valve. Thereafter, a key is fitted through the aperture in the table and connected to the stem of the valve. The hydraulic motors are then operated to rotate the key and the valve stem to open or close the valve.

To receive an existing valve operating machines, a truck must be modified to accept the machine. If the machine is to be mounted on a pickup truck, the frame may be bolted to the bed of the truck and a hole cut in the side of the truck bed such that the table can extend outward through the hole. Alternatively, metal bars may be welded across the sides of the truck for mounting the machine in an elevated position over the bed to thereby avoid cutting a hole in the side of the truck. With this mounting, the table can slide across the top of the sides of the truck which border the bed. It would be desirable to provide a mounting for a valve operating machine which could be mounted on a truck without requiring that the truck be modified by the addition of mounting bars or cutting holes in the side of the truck.

Furthermore, operators have had difficulty inserting a key into the aperture extending through the table of existing machines. Existing machines provide a pair of hydraulic motors positioned in opposite sides of a bull gear having a central aperture which receives the key. The key itself is heavy, making it awkward to handle. Operators have found it difficult to insert the key through the aperture because the upper surface of the table is cluttered by the motors and other equipment mounted thereon.

Located within the bull gear in the table is a drive knuckle having a semispherical surface, and extending through the drive knuckle is the aperture having a polygon shaped cross-section into which the key is fitted. Movement of the knuckle enables the machine to receive a key which, because of the terrain on which the vehicle is positioned, or other factors, cannot be positioned perpendicular to the plane of the table. The knuckle includes a pivot ball fitted into a complementarily shaped socket. It is the pivot ball which has the vertical aperture extending therethrough for receiving the key. A pin extends from the inner wall of the socket and into a vertical groove in the side of the ball to transfer rotational movement from the socket in the bull gear to the ball of the drive knuckle in which the key is fitted. It has been found, however, that where the key is positioned several degrees from being perpendicular to the plane of the table, the ball in the knuckle will move back and forth with respect to the pin with each rotation of the bull gear and interfere with the smooth transfer of power to the drive key. It would be desirable, therefore, to provide a drive for transferring rotational motion from the bull gear to the drive key without the problems associated with the pins.

To operate a valve turning machine, the table must be locked with respect to the frame such that the table retains it orientation while the machine is in operation. Existing machines have a plurality of holes in one of the telescoping members on either the frame or the table and a corresponding hole in the other of the frame of the table, such that the holes in the two parts can be aligned and longitudinally locked by inserting a pin through the aligned holes. Typically, the locking holes are spaced a distance of approximately two inches apart along one of the members, so that the table can only be locked at intervals of two inches. It would be desirable to provide a table which can be locked at any location with respect to the frame such that the table can be more precisely positioned over a valve.

SUMMARY OF THE INVENTION

Briefly, the present invention is embodied in a valve turning machine having a frame and a table movable with respect to the frame from a retracted position to an extended position. The frame has a first frame portion having a pair of parallel first side members, and a second frame portion having a pair of parallel second side members which telescopically engage the first slide members such that the length of the frame can be adjusted. The first frame member has an end portion which is attachable to one of the sides of a truck bed, and the second frame member has an end portion which is attachable to the opposite side of the truck.

Mounted on each of the telescoping side members of the frame is a longitudinal slide such that the two slides are positioned parallel to each other. The table has parallel sides and extending along the sides of the table are parallel tracks which fit around the slides on the frame. The tracks have inner surfaces which contact the outer surfaces of the slides, and one of the inner surfaces of the tracks and the outer surfaces of the slides is made of a material having a low coefficient of friction to facilitate the sliding of the table with respect to the frame.

In the preferred embodiment, a roller is positioned toward the outer end of each of the slides to facilitate the movement of the slide within the tracks. Also, an over-the-center pressure lock on the track applies pressure to the slide to lock the slide longitudinally with respect to the track for locking the table with respect to the frame.

Positioned under the upper surface of the table is a bull gear driven by a hydraulic motor and the central portion of the bull gear has a semi-spherical shaped socket for receiving the ball of the knuckle therein. Extending vertically through the ball is an aperture having a polygon cross section for receiving a key. The outer surface of the ball has a generally vertical groove therein and the socket has an indentation in its inner wall. A solid spherical metal ball is fitted into the cavity formed when the groove of the knuckle is aligned with the indentations of the socket to translate rotational power to the knuckle.

To minimize the obstruction of the upper surface of the table, the bull gear is driven by a single hydraulic motor positioned rearward of a plane perpendicular to the axial length of the table and passing through the aperture therein, such that the portion of the motor extending above the surface of the table will not obstruct the inserting of a key into the aperture.

BRIEF DESCRIPTION OF THE DRAWINGS

A better understanding of the present invention will be had after a reading of the following detailed description taken in conjunction with the drawings wherein:

FIG. 2 is a top view of a first frame portion for mounting a machine shown in FIG. 1 to the truck;

FIG. 3 is a side view of the first frame portion shown in FIG. 2;

FIG. 4 is a top view of a second frame portion for slidable engagement with the first frame portion shown in FIG. 2;

DETAILED DESCRIPTION OF A PREFERRED EMBODIMENT

Figure 1:
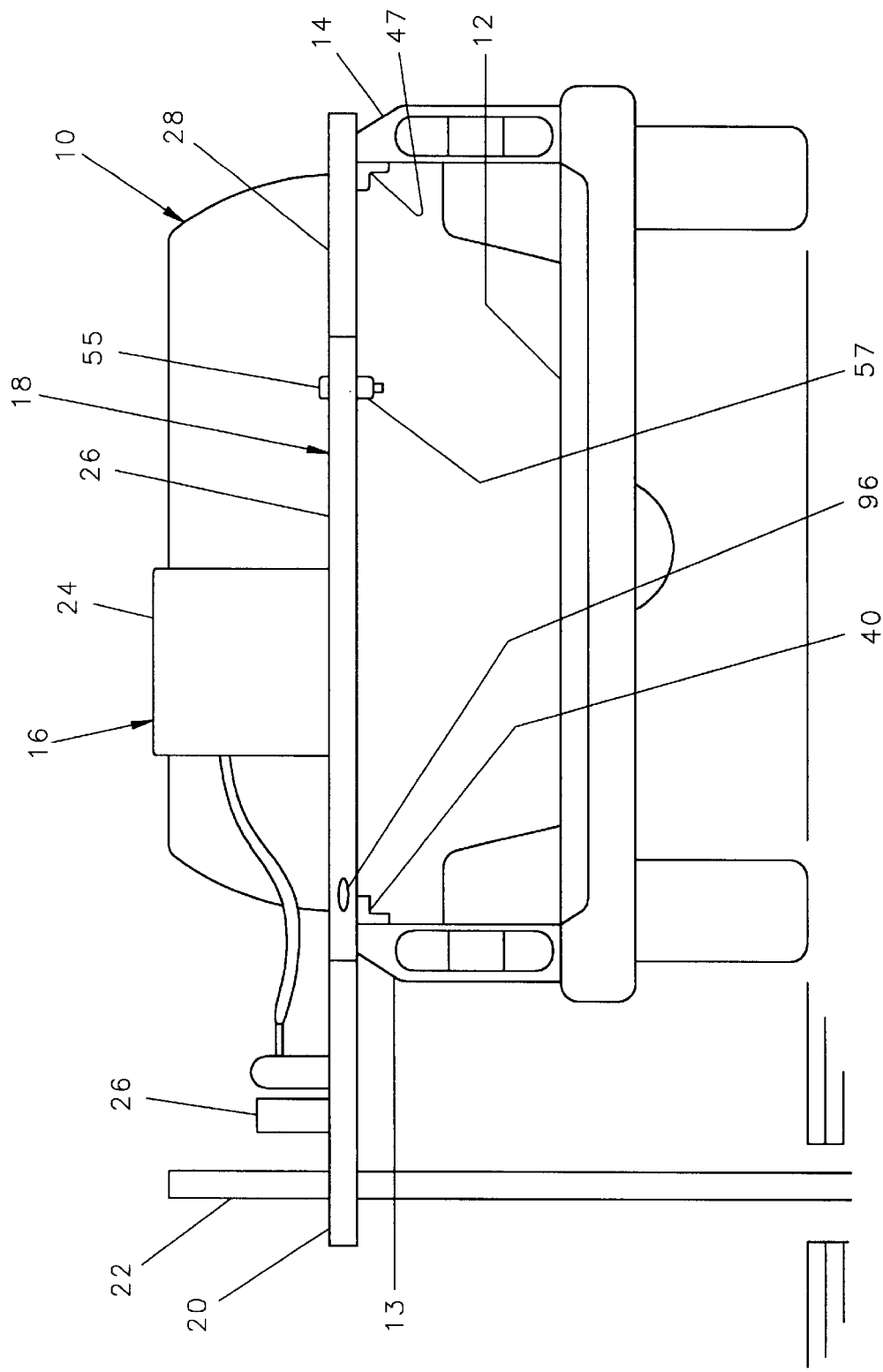
FIG. 1 is a rear view of the bed of a pickup truck having a valve turning machine in accordance with the present invention mounted thereon with the table in the extended position and a key extending through the table for attachment to the stem of a valve.

Referring to FIG. 1, a truck 10 to which a valve turning machine is to be attached has a bed 12 and side walls 13, 14 across which is positioned a valve turning machine 16 having a longitudinally adjustable frame 18. The valve turning machine 16 has a longitudinally movable table 20 through which extends a transverse hole, visible only in FIGS. 5 and 6, into which is fitted an elongate key 22, the lower end of which attaches to the stem of a valve, not shown. The key is rotated by an hydraulic system including a reservoir 24 and a hydraulic motor 26.

Referring to FIGS. 1, 2, 3 and 4, the frame 18 includes a first frame portion 26 which slidably receives a second frame portion 28. The first frame portion 26 includes first and second rectangular hollow first frame members 30, 32, which are retained in parallel spaced relation to each other by first and second cross supports 34, 36. The first cross support 34 has a plurality of holes 38 into which are bolted a first angle member 40 having a downwardly extending flange which is offset from the distal ends of the frame members 30, 32. Similarly, the second frame portion 28 has parallel second frame members 42, 44 which are retained in spaced relation to each other by a cross support 45. The cross support 45 has holes 46 into which are bolted a second angle member 47 having a downwardly extending flange off set from the distal ends of the frame members 42, 44. The distal ends of the first frame members 30, 32 may be positioned on one side of a truck bed and the distal ends of the second frame members positioned on the opposite side of the truck bed with the flanges of angle members 40, 47 fitted against the inner sides of the truck bed to retain the machine thereon as shown in FIG. 1.

The second frame members 42, 44, have generally rectangular cross-sectional shapes with outer dimensions which are a little less than the inner dimensions of the first frame members 30, 32 such that the inner distal ends 48, 50 of the second frame members 42, 44, respectively, are slidably received within the first frame members 30, 32, respectively. Spaced along the length of second frame members 42, 44 are a plurality of transverse holes 51, 52, and positioned horizontally through the first frame members 30, 32 are holes 53, 54 each of which can be aligned with one of the pair of the corresponding holes 51, 52 of the second frame member. Bolts 55, are inserted through the holes 51, 52 and 53, 54 respectively, and are retained in position by nuts 57 to lock the first and second frame members in longitude relationship to each other with the angle members 40, 47 positioned against the inner surface of the walls of the truck bed and the remaining lip extending across the sides of the truck bed. The angle members 40, 47 and the distal ends of the frame members which rest on the side walls 13, 14 of the truck will therefore retain the assembled frame 18 on the bed of a truck as shown in FIG. 1.

Figure 5:
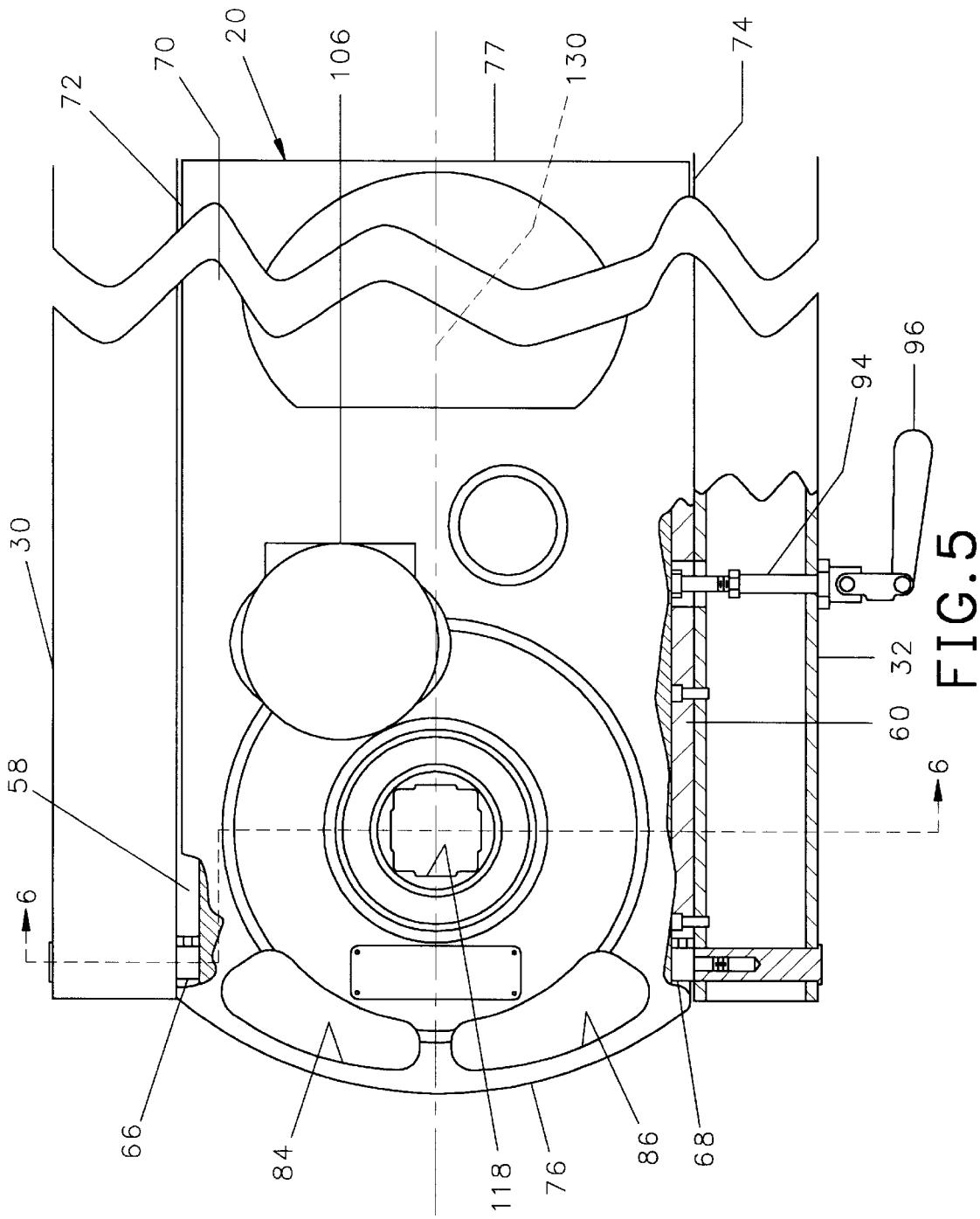
FIG. 5 is a top fragmentary view, with portions therein broken away, of a table and portions of the frame of the machine shown in FIG. 1.
Figure 6:
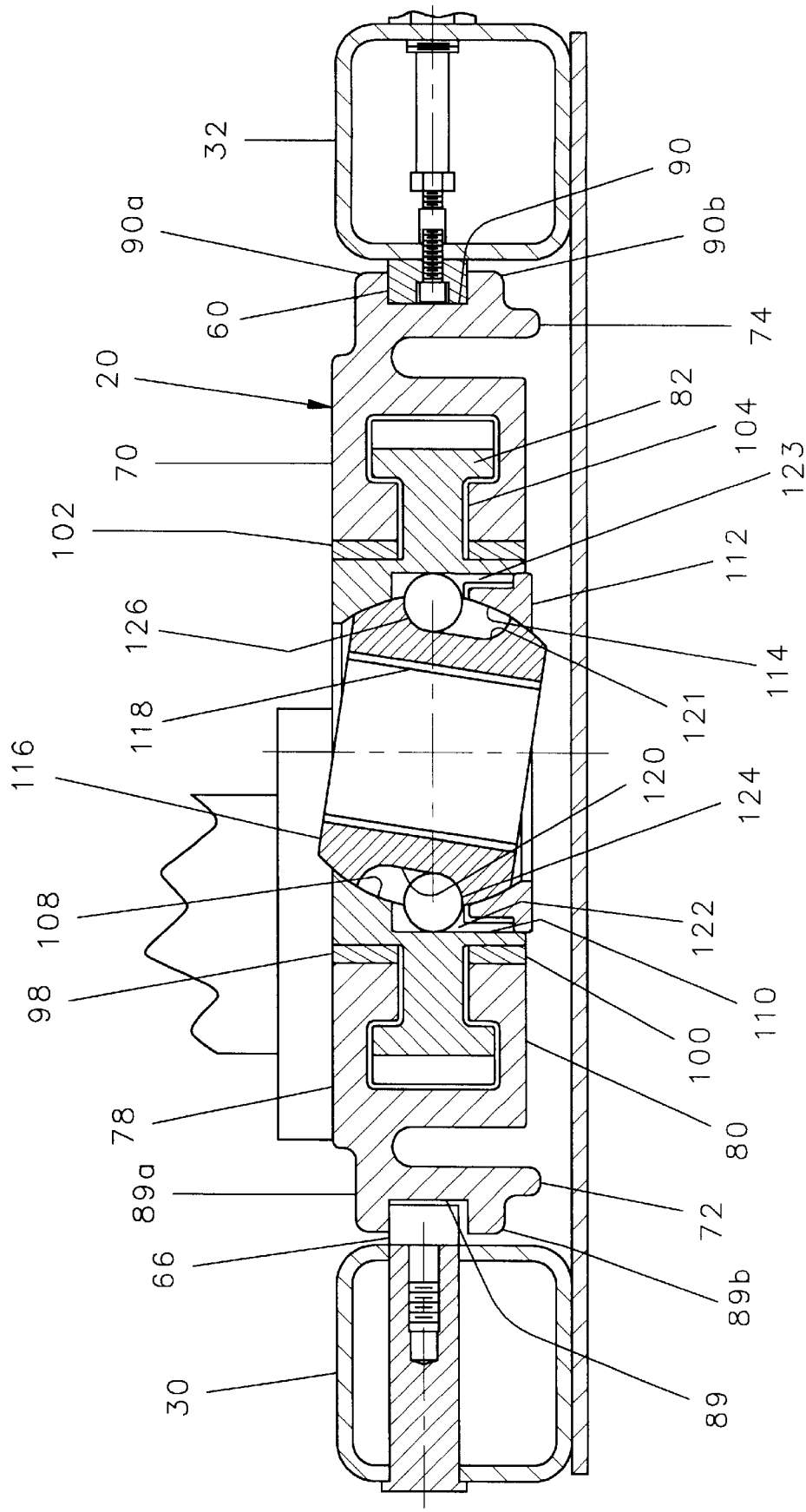
FIG. 6 is an enlarged cross-sectional view through line 5—5 of the table and frame shown in FIG. 5.

Referring to FIGS. 2, 5 and 6, extending along the inner sides of the first frame members 30, 32 are slides 58, 60, each having a rectangular cross section, the outer surface of which is made of a friction resistant material such as sold under the mark TEFLON. At the distal end 62, 64 of the first frame member 30, 32, are a pair of rollers 66, 68 each of which is positioned adjacent the distal ends of slides 58, 60.

The table 20 has a generally planar upper surface 70, generally parallel sides 72, 74, an outer end 76 and an inner end 77. In the preferred embodiment, the table is manufactured by casting upper and lower portions 78, 80 which are assembled around a bull gear 82, and provide for hand holes 84, 86 at the outer end thereof. Machined into the sides 72, 74 are a pair of outwardly opening tracks 89, 90 defined by upper guides 89a, 90a and lower guides 89b, 90b, respectively. The upper and lower surfaces of the tracks are spaced a distance which is a little greater than the height of the slides 58, 60, and the inner surfaces of the tracks 88, 90 are spaced a distance which is a little less than the distance between the outer surfaces of the slides 58, 60 such that the tracks 88, 90 of the table 20 will be slidably received around the slides 58, 60 and rollers 66, 68.

Referred to FIGS. 2, 3 and 5, the side walls of first frame member 30 have aligned holes 92, 93 therein and extending through the holes 92, 93 is a movable leg 94, the lower end of which can be compressed against the inner surface of track 90 by rotating an over-center hand lock 96. Rotation of the over-center lock 96 forces the leg 94 against the track 90 to lock the table 20 longitudinally with respect to the frame 16.

Referring again to FIGS. 5 and 6, the bull gear 82 is positioned near the outer end of the table 20 below the upper surface 70 and is retained in position by annular bearings 98, 100 in the upper and lower table portions 78, 80, respectively. Thrust washers 102, 104 positioned above and below the bull gear 82 facilitate the rotation of the bull gear within the table 20. The teeth of the bull gear 82 engage teeth on a pinion gear, not shown, on the shaft of a hydraulic motor 106 such that the bull gear is driven by the hydraulic motor 106. The direction and force in which the motor is driven is controlled by the control mechanism of the type shown in Arnemann, U.S. Pat. No. 5,381,996.

Referring to FIG. 6, the bull gear 82 has a central opening, the upper portion 108 of which defines a portion of a sphere, and the lower portion 110 is generally cylindrical. Fitted within the lower portion 110 is an annular retainer 112 which also has an inner surface 114 which defines a portion of a sphere complementary to the portion formed by upper portion 108. The inner surfaces of upper portion 110 and retainer 112 therefore form a socket. Moveably fitted into the socket formed by the inner surfaces of the parts is a generally spherical drive ball 116. Extending vertically through the center of the drive ball 116 is a non-circular transverse hole 118 into which a key 22 can be fitted.

Spaced around the circumference of the drive ball 116 are a plurality of vertically oriented slots, two of which 120, 121 are visible. Fitted within the slots 120, 122 and around the inner surface of the lower cylindrical portion 110 of the central opening of the bull gear are hardened spherical balls 124, 126. Extending upward into the inner surface of the bull gear 82 are a corresponding plurality of notches 122, 123. When the socket is assembled around the ball 116, the notches 122, 123 are aligned with the slots 120, 121 of the ball, and a plurality of hardened metal balls 124, 126 are inserted in the cavities formed by the aligned parts and are retained therein by the annular retainer 112. When the bull gear 82 is rotated by the motor 106, the rotational motion of the bull gear is transferred to the ball 116 by the balls 124, 126 which are locked against angular rotation within the bull gear within the notches 122, 123 of the retainer 112. The balls 124, 126, therefore, allow rotational motion of the ball 116 within the bull gear with a minimum of resistance.

Also, as best shown in FIG. 5, the motor 106 with the shaft thereof, and the gear attached thereto, not shown, are positioned to engage the teeth of the bull gear which extend generally toward the inner end 77 and away from the outer end 76, such that the motor 106 is positioned toward the rearward end 77 of the table 20. The upper surface 70 of the table 20 is substantially planar forward of a plane 128 positioned perpendicular to the longitudinal axis 130 of the table 20 and inward of the transverse hole 118 through the ball 116. Accordingly, the upper surface 70 of the table 20 is unobstructed when approached from the outward end 76 and enable an operator to easily insert a key 22 through the central opening 118 of the ball 116.

While one embodiment of the present invention has been disclosed, it will be apparent to those skilled in the art that many changes and modifications may be made without departing from the true spirit and scope of the invention. It is the purpose of the appended claims to cover all such changes and modifications which fall within the true spirit and scope of the invention.

What is claimed:

1. A valve turning machine comprising:
   a frame for mounting said machine, said frame having a pair of spaced apart side members,
   a table moveable on said frame from a retracted position to an extended position,
   said table having parallel side portions with one side portion fitted against each of said side members of said frame,
   drive means on said table for rotating a key extending through said table,
   motor means in said table for rotating said drive means,
   a pair of parallel tracks, each of said tracks mounted on one of said pair of spaced side members and said parallel side portions,
   a slide mounted on each ones of the others of said pair of spaced side members and said parallel side portions, each said slide moveable within one of said tracks,
   each of said tracks having an inner surface for contacting an outer surface on said slide,
   one of said inner surface and said outer surface being made of material having a low coefficient of friction.

2. A valve turning machine in accordance with claim 1 and further comprising,
   a roller positioned at the forward end of each said slide with each said roller rotatable within one of said tracks.

3. A valve turning machine in accordance with claim 1 and further comprising,
   pressure lock means on one of said frame and said table for locking said table with respect to said frame.

4. A valve turning machine in accordance with claim 1 wherein,
   said table further comprising a generally horizontal upper surface, an outer end, an inner end and an aperture extending generally vertically through said table and through said upper surface,
   said drive means positioned below said upper surface,
   a motor having a portion thereof extending above said upper surface, said motor for rotating said drive means,
   said portion of said motor extending above said upper surface being rearward of a plane perpendicular to said parallel sides and passing through said aperture to allow insertion of said key in said aperture without obstruction by said motor.

5. A valve turning machine in accordance with claim 1 wherein,
   said drive means comprises a bull gear in said table,
   said table comprises a upper member and a lower member assembled together, said assembled members enclosing said bull gear,
   each of said tracks comprising a horizontally extending upper guide member and lower guide member, said upper guide members and said lower guide members extending from one of said upper member and said lower member, and
   said one of said upper member and said lower member, said upper guide members and said lower guide members formed as a unitary part.

6. A valve turning machine in accordance with claim 1 wherein,
   said frame comprising a first frame portion and a second frame portion,
   said first frame portion having a pair of parallel first side members section and a first end section for mounting on a side of a vehicle,
   said second frame portion having a pair of parallel second side members slidably engageable in said first side members, whereby the slidable engagement of said first slide members with said second slide members forms said side members,
   said second frame portion further having a second end section for mounting on a side of a vehicle opposite from said first end section when said first frame portion and said second frame portion are slidably engaged with each other.

7. A valve turning machine comprising:

a frame for mounting said machine, said frame having a pair of spaced apart side members, a table moveable on said frame from a retracted position to an extended position, said table having parallel side portions with one side portion fitted against each of said side members of said frame when said table is on said frame, drive means on said table for rotating a key extending through said table, motor means on said table for rotating said drive means, a pair of parallel tracks each of said tracks mounted on ones of said pair of spaced side members and said parallel sides, said frame comprising a first frame portion and a second frame portion, said first frame portion having a pair of parallel first side members and a first end section for mounting on a side of a vehicle, said second frame portion having a pair of parallel second side members slidably engageable in said first side members, said second frame portion further having a second end section for mounting on a side of a vehicle opposite from said first end section when said first frame portion and said second frame portion are slidably engaged with each other.

8. A valve turning machine in accordance with claim 7 wherein, said first frame portion has a plurality of spaced holes in one of said parallel first side members, said second frame portion has a hole in said one of said second side members, and a pin extending through said hole in said one of said second side members and into one of said plurality of spaced holes in said one of said parallel first side members for locking said frame for attachment to a truck having a bed of a given size.

9. A valve turning machine comprising:

a frame for mounting said machine said frame having a pair of spaced apart side members, a table moveable on said frame from a retracted position to an extended position, said table having parallel side portions with one side portion fitted against each of said side members of said frame when said table is on said frame, said table further having a generally horizontal upper surface, an outer end, an inner end and an aperture extending generally vertically through said table and through said upper surface, said table having drive means below said upper surface, said drive means for rotating a key extending through said said table having an upper surface which is free of obstructions such that said key can be inserted into said aperture by an operator without encountering obstructions.

10. A valve turning machine in accordance with claim 9, and further comprising, a motor having a portion thereof extending above said upper surface, said motor for rotating said drive means, said portion of said motor extending above said upper surface being rearward of a plane perpendicular to said parallel sides and passing through said aperture to allow insertion of said key in said aperture without obstruction by said motor.

* * * * *

UNITED STATES PATENT AND TRADEMARK OFFICE
CERTIFICATE OF CORRECTION

PATENT NO. : 6,009,905
DATED : January 4, 2000
INVENTOR(S) : Scott Arnemann

It is certified that error appears in the above-indentified patent and that said Letters Patent is hereby corrected as shown below:

In column 8, line 22, after "said" insert

--table--

Signed and Sealed this

Sixteenth Day of January, 2001

Attest:

Attesting Officer

Q. TODD DICKINSON
Commissioner of Patents and Trademarks